(12) United States Patent
Kimura et al.

(10) Patent No.: US 7,069,297 B2
(45) Date of Patent: Jun. 27, 2006

(54) DATA TRANSFER SCHEME USING RE-DIRECT RESPONSE MESSAGE FOR REDUCING NETWORK LOAD

(75) Inventors: Yasuhiro Kimura, Kanagawa (JP); Yuichi Koba, Kanagawa (JP); Kenichiro Yoshii, Tokyo (JP); Atsushi Shono, Kanagawa (JP); Hideaki Sato, Kanagawa (JP); Toshibumi Seki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 658 days.

(21) Appl. No.: 10/396,396

(22) Filed: Mar. 26, 2003

(65) Prior Publication Data

US 2003/0187923 A1 Oct. 2, 2003

(30) Foreign Application Priority Data

Mar. 27, 2002 (JP) .............................. 2002-089949

(51) Int. Cl.
*G06F 13/00* (2006.01)
(52) U.S. Cl. ..................... 709/203; 709/217; 709/219; 709/227
(58) Field of Classification Search ........ 709/200–203, 709/217–224, 227
See application file for complete search history.

(56) References Cited

U.S. PATENT DOCUMENTS

| 5,682,514 A | * | 10/1997 | Yohe et al. ................. 711/118 |
| 5,835,943 A | * | 11/1998 | Yohe et al. ................. 711/118 |
| 6,012,085 A | * | 1/2000 | Yohe et al. ................. 709/217 |
| 6,675,161 B1 | * | 1/2004 | Suchter ......................... 707/5 |
| 6,775,743 B1 | * | 8/2004 | Patel ........................... 711/118 |
| 6,813,690 B1 | * | 11/2004 | Lango et al. ................ 711/118 |
| 6,941,302 B1 | * | 9/2005 | Suchter ......................... 707/5 |
| 6,990,628 B1 | * | 1/2006 | Palmer et al. .............. 715/500 |

FOREIGN PATENT DOCUMENTS

| JP | 2986097 | 12/1999 |
| JP | 3102369 | 10/2000 |
| JP | 3167484 | 5/2001 |

OTHER PUBLICATIONS

Accelerating Enterprise Applications With FineGround Condenser Acceleration Suite™ 4.0, pp. 1-18, "A Technical Whitepaper", May 2002.

* cited by examiner

*Primary Examiner*—Moustafa M. Meky
(74) *Attorney, Agent, or Firm*—Oblon, Spivak, McClelland, Maier & Neustadt, P.C.

(57) ABSTRACT

At a data transfer device for transferring a request message from a first communication device to a second communication device, and transferring a response message containing a response data from the second communication device to the first communication device, an identifier to be allocated to the response data contained in the response message is generated according to a content of the response data, and a re-direct response message for re-directing the first communication unit to a URL containing the identifier is transmitted to the first communication device, instead of transmitting the response message, when the response message is received from the second communication device, and the response message containing the response data stored in the memory in correspondence to the identifier contained in the URL is transmitted when the request message for the URL containing the identifier is received from the first communication device.

12 Claims, 10 Drawing Sheets

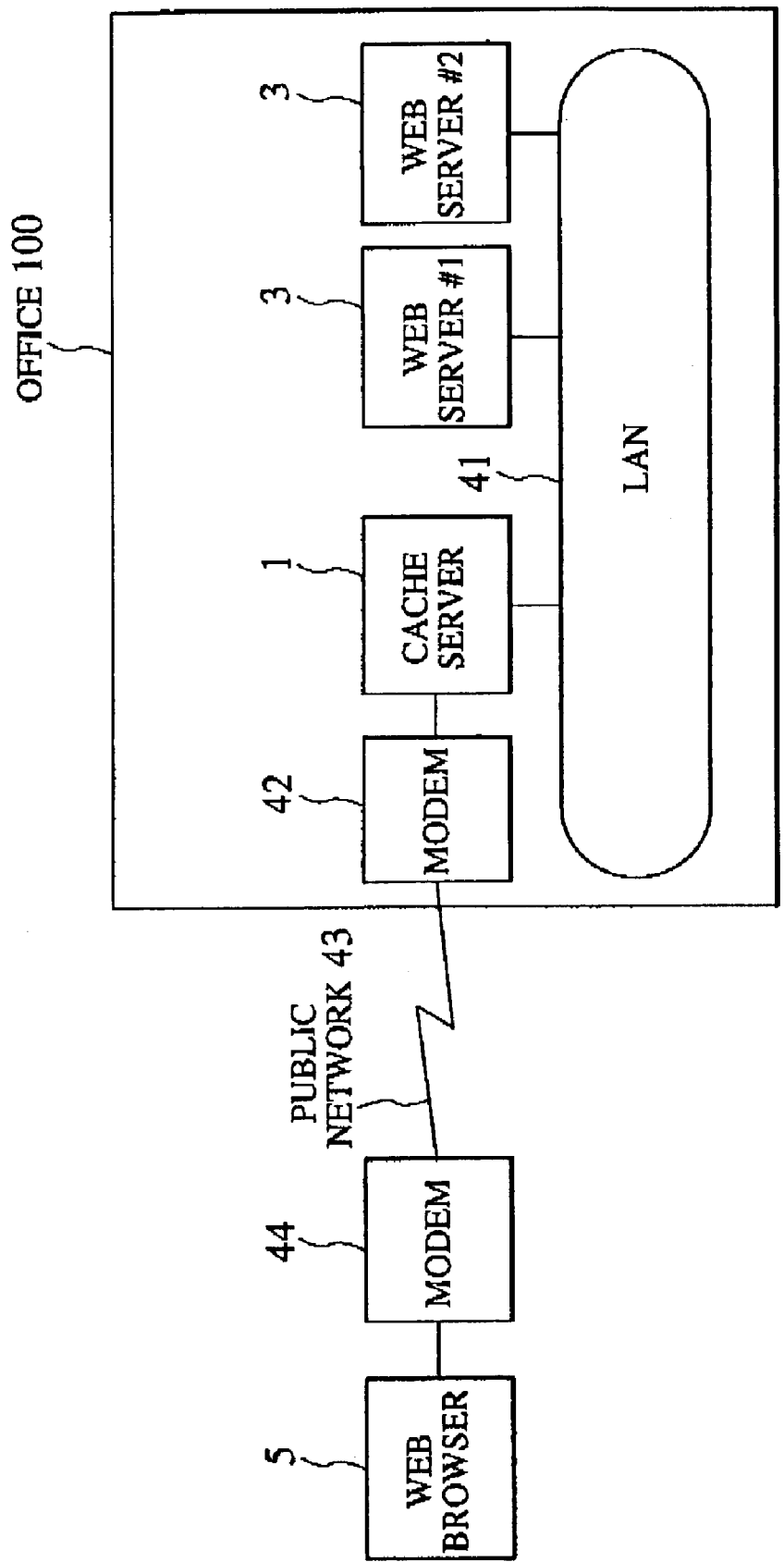

DATA TRANSFER SCHEME USING RE-DIRECT RESPONSE MESSAGE FOR REDUCING NETWORK LOAD

BACKGROUND OF THE INVENTION

1. Field of the Invention

The present invention relates to a data transfer scheme for carrying out data transfer at a data transfer device on behalf of another device.

2. Description of the Related Art

The client-server type information system formed by servers for providing various services through a network and clients for requesting desired services to the servers has been widely used. In particular, the World Wide Web system (which is also simply called Web) formed by Web servers and clients that communicate with each other by using the HTTP protocol on the Internet is the very widely used client-server type information system. Usually, a server program is operating on a server and a prescribed tool (program) such as a browser is operating on a client. The contents of the services provided on the Internet are also wide ranging so that there are various existing services including services for providing, delivering or transferring information such as that of text, still image, video and audio (home pages, e-mails, and digital contents, for example) or programs, electronic shop services for selling goods, reservation services for seats, rooms, etc., agency services for various contracts, etc., and services in new styles are appearing steadily.

Now in the client-server type information system such as the Web, the service is provided basically by carrying out data transfer between the client and the server, regardless of the style of the service to be provided. Consequently, a capacity (bandwidth) of the network to be used for communications between the client and the server tends to be a bottleneck of the entire system. For this reason, usually, the caching technique has been used in order to reduce the network load.

In the case of the Web system, the browser or the like that is operating on the client often uses a cache mechanism for caching recently accessed data. In the Web, accesses are made by specifying information or services by using names called URLs, so that among data that are returned in response to information or services requested to the Web servers in the past, those data that are cachable are recorded in the cache on the client in correspondence with their URLs. In this case, when an information or service with the same URL as that recorded in the cache is requested, if it is possible to judge that the response data recorded in the cache has not become obsolete, it is possible to eliminate a communication between the client and the Web server by returning that response data recorded in the cache.

When a plurality of users are existing on a LAN inside offices of an enterprise, a LAN of a research organization or a LAN inside a home, it is popular to provide a proxy server between that LAN and the Internet and provide the cache mechanism in the proxy server. The cache inside the client (the cache of the browser, for example) will be operated as a dedicated cache of that client or user, but the cache of the proxy server on the LAN will be operated as a cache shared by users of the plurality of clients. For this reason, the cache of the proxy server works efficiently even in the case of making an access to the URL accessed by another client in the past.

Now, in the Web, communications between the client and the server are carried out by the protocol called HTTP. The HTTP protocol uses a set of a "request message" to be sent from the client to the server and a "response message" to be returned from the server to the client in response to that request.

The request message is formed by a "request header" and a "request body". The request header contains various information necessary for the access such as a URL for specifying an information or service to be accessed and a method name indicating the type of access. The request body contains data to be sent to the server. Such data contained in the request body are also referred to as "request data".

The major methods for the request message that are used for accesses of information or services include a "GET method" that reads out an information on the server, a "PUT method" that writes data of the user into the server, and a "POST method" that receives a processing result from the server in response to the request. Besides them, methods such as a "DELETE method" are also defined.

In many cases, the request body of the request message in the GET method and the response body of the response message in the PUT method are empty. The request body or the request message in the POST method contains information to be used for the processing on the server side if necessary, and the response body of the response message in the POST method contains data obtained as a result of the processing of the server.

The data to be read out from the server by the GET method can be classified into "dynamic data" that are to be generated at the server side at a time or each request and "static data" that are to be returned by just reading the stored data in the server. The dynamic data can possibly have different contents at different occasions of reading even for the same URL, so that in many cases, the server returns the response message with the response header that includes an indication that it is not cachable. Consequently, what are to be the caching targets among the Web data are the static data.

These static data can be classified into "shared data" that can be accessed by unspecified many users and "private data" that allowed accesses only to the specific user by the user authentication. The former shared data are cachable for any caches. However, the latter private data are not cachable for a shared cache such as that of the proxy server (because there is a need for the server to return the private data after the user authentication). The private data are cachable in the case of a personal dedicated cache such as that of the browser.

In the POST method, the server returns the result by the response message with the response header that includes an indication that it is not cachable in general. For this reason, the response data of the POST method are usually not the caching target.

In the PUT method, data are to be sent to the server so that there is no processing that involves the cache.

On the other hand, the response message is formed by a "response header" and a "response body". The response header contains a status code indicating a processing result and various headers for notifying information associated with it, and the response body contains the requested information or data of the processing result of the requested service. Such data contained in the response body are also referred to as "response data".

The status code of the response header comprises three digits number. The meaning of the status code is different for each numerical value, and can be largely classified into five classes according to the numerical value of the first one digit.

The class of the first digit "1" is a class used in the situation where the processing corresponding to the request is still continuing. For example, the status code "100" indicates that the processing is in progress, and after receiving this status code, the browser have to wait until the further response comes from the server.

The class of the first digit "2" is a class that generally indicates success. For example, When an access to data located at the URL specified by the GET method is accepted, the server transmits a response message formed by the response header that contains the status code "200" and the response body that contains the data corresponding to the URL, to the client. Also, when the storing of the data into the URL specified by the PUT method succeeds, the response message with the response header containing the status code "201" is transmitted to the client.

The class of the first digit "3" is a class that indicates the re-direction. When the server returns the status code belonging to this class in response to the request of the client, it implies that "some further action at the client side is necessary in order to fulfill the purpose for which this request was transmitted".

For example, when the services normally provided on that server cannot be provided temporarily due to some trouble of the server machine, the other server is often employed to provide these services as substitution, and in such a case, the server in trouble can return the response with the status code "302" indicating that "what is requested is temporarily provided at another location" and a Location header containing the URL of a location at which the services are provided as substitution, in response to the request from the client. When the response containing the status code "302" is received, the client can have the desired service provided by referring to the URL written in the Location header described above and transmitting the request again with respect to the server corresponding to that URL.

Also, there are many Web browsers which have the cache function as mentioned above, and when such a Web browser having the cache function transmits the GET request again with respect to the URL for which the data is already cached, the time at which the data of this URL was received previously is attached to the request as an associated information. This implies that the server is requested in such a manner as "please transmit the data only when the data corresponding to the URL has been updated after that time". Such a method is generally called re-validation, and the server can return the status code "304" to the browser in response to the validation request from the browser, when the data corresponding to the URL has not been updated after the specified time. This is the status code that implies "please use the local copy", and when this response is received, the browser takes out the cached data again and utilize it as the data obtained as a result of the GET request.

The class of the first digit "4" is a class that indicates the occurrence of some error due to the client side. For example, when the client program with a bug transmits the request that is not in accordance with the HTTP specification, the server returns the status code "400", in order to notify that the request is not in accordance with the HTTP specification. Also, when the request with respect to the non-existing URL is transmitted due to a typographical error by the user, the server returns the status code "404", in order to notify that the specified URL does not exist.

The class of the first digit "5" is a class that indicates the occurrence of some error due to the server side. For example, when the server falls into the situation where the services cannot be provided temporarily due to some trouble of the server machine and it is impossible to provide another machine for providing the services as a substitution, the server returns the status code "503" in response to the request from the client, in order to notify that it is in the situation where the service cannot be provided temporarily.

In the conventional Web cache, the caching targets are the static contents. Many information or services on the Web were disclosed to unspecified many users and the information was updated not frequently, so that the rate of the static contents were very high and therefore even the conventional caching technique was effective in reducing the network load.

However, in conjunction with the spread of a system in which the user makes accesses to the information or services on the server through the network by using the Web browser such as that of Web based ASP (Application Service Provider), the amount of data that cannot be handled by the conventional caching technique is increasing. For example;

there are many private data for which the accessible users are limited by the user authentication;

there are many dynamic data to be generated by referring to the back-end database;

there are many cases of using the POST method such as those of the accounting slip processing and the searching; and there are many cases of using the PUT method for the purpose of sharing information within a group.

As a consequence, the use of the conventional caching technique alone has been becoming rather ineffective as a method for reducing the network load.

BRIEF SUMMARY OF THE INVENTION

It is therefore an object of the present invention to provide a data transfer device and a data transfer method capable of reducing the load on a network that connects one communication device and the data transfer device, in the case of making a request from the one communication device to another communication device and transferring a prescribed data from the another communication device to the one communication device according to that request.

According to one aspect of the present invention there is provided a data transfer device for receiving a request message transmitted from a first communication device through a network and transferring the request message to a second communication device, and receiving a response message containing a response data returned from the second communication device that received the request message and transferring the response message to the first communication device, the data transfer device comprising: a first receiving unit configured to receive the request message transmitted from the first communication device; a first transmission unit configured to transmit the request message to the second communication device when the request message is one that should be transferred to the second communication device; a second receiving unit configured to receive the response message containing the response data returned from the second communication device; an identifier generation unit configured to generate an identifier to be allocated to the response data contained in the response message, according to a content of the response data; a memory unit configured to store at least the response data and the identifier in correspondence; and a second transmission unit configured to transmit to the first communication device a re-direct response message for re-directing the first communication device to a URL containing the identifier, instead of transmitting the response message containing the response data, when the response message containing the response data is received from the second communication device, and transmit the response message containing the response data stored in the memory unit in correspondence to the identifier contained in the URL when the request message for the URL containing the identifier is received from the first communication device through the first receiving unit.

According to another aspect of the present invention there is provided a data transfer method for receiving a request message transmitted from a first communication device through a network and transferring the request message to a second communication device, and receiving a response message containing a response data returned from the second communication device that received the request message and transferring the response message to the first communication device, the method comprising: receiving the request message transmitted from the first communication device; transmitting the request message to the second communication device when the request message is one that should be transferred to the second communication device; receiving the response message containing the response data returned from the second communication device; generating an identifier to be allocated to the response data contained in the response message, according to a content of the response data; storing at least the response data and the identifier in correspondence in a memory; and transmitting to the first communication device a re-direct response message for re-directing the first communication device to a URL containing the identifier, instead of transmitting the response message containing the response data, when the response message containing the response data is received from the second communication device, and transmitting the response message containing the response data stored in the memory in correspondence to the identifier contained in the URL when the request message for the URL containing the identifier is received from the first communication device.

According to another aspect of the present invention there is provided a computer program product for causing a computer to function as a data transfer device for receiving a request message transmitted from a first communication device through a network and transferring the request message to a second communication device, and receiving a response message containing a response data returned from the second communication device that received the request message and transferring the response message to the first communication device, the computer program product comprising: a first computer program code for causing the computer to receive the request message transmitted from the first communication device; a second computer program code for causing the computer to transmit the request message to the second communication device when the request message is one that should be transferred to the second communication device; a third computer program code for causing the computer to receive the response message containing the response data returned from the second communication device; a fourth computer program code for causing the computer to generate an identifier to be allocated to the response data contained in the response message, according to a content of the response data; a fifth computer program code for causing the computer to store at least the response data and the identifier in correspondence; and a sixth computer program code for causing the computer to transmit to the first communication device a re-direct response message for re-directing the first communication device to a URL containing the identifier, instead of transmitting the response message containing the response data, when the response message containing the response data is received from the second communication device, and transmit the response message containing the response data stored in the memory unit in correspondence to the identifier contained in the URL when the request message for the URL containing the identifier is received from the first communication device through the communication device through the first receiving unit.

Other features and advantages of the present invention will become apparent from the following description taken in conjunction with the accompanying drawings.

BRIEF DESCRIPTION OF THE DRAWINGS

FIG. 12 is a block diagram showing another exemplary configuration of a computer network system in which a cache server according to one embodiment of the present invention is provided.

DETAILED DESCRIPTION OF THE INVENTION

Referring now to FIG. 1 to FIG. 12, one embodiment of the data transfer scheme according to the present invention will be described in detail.

Figure 1:
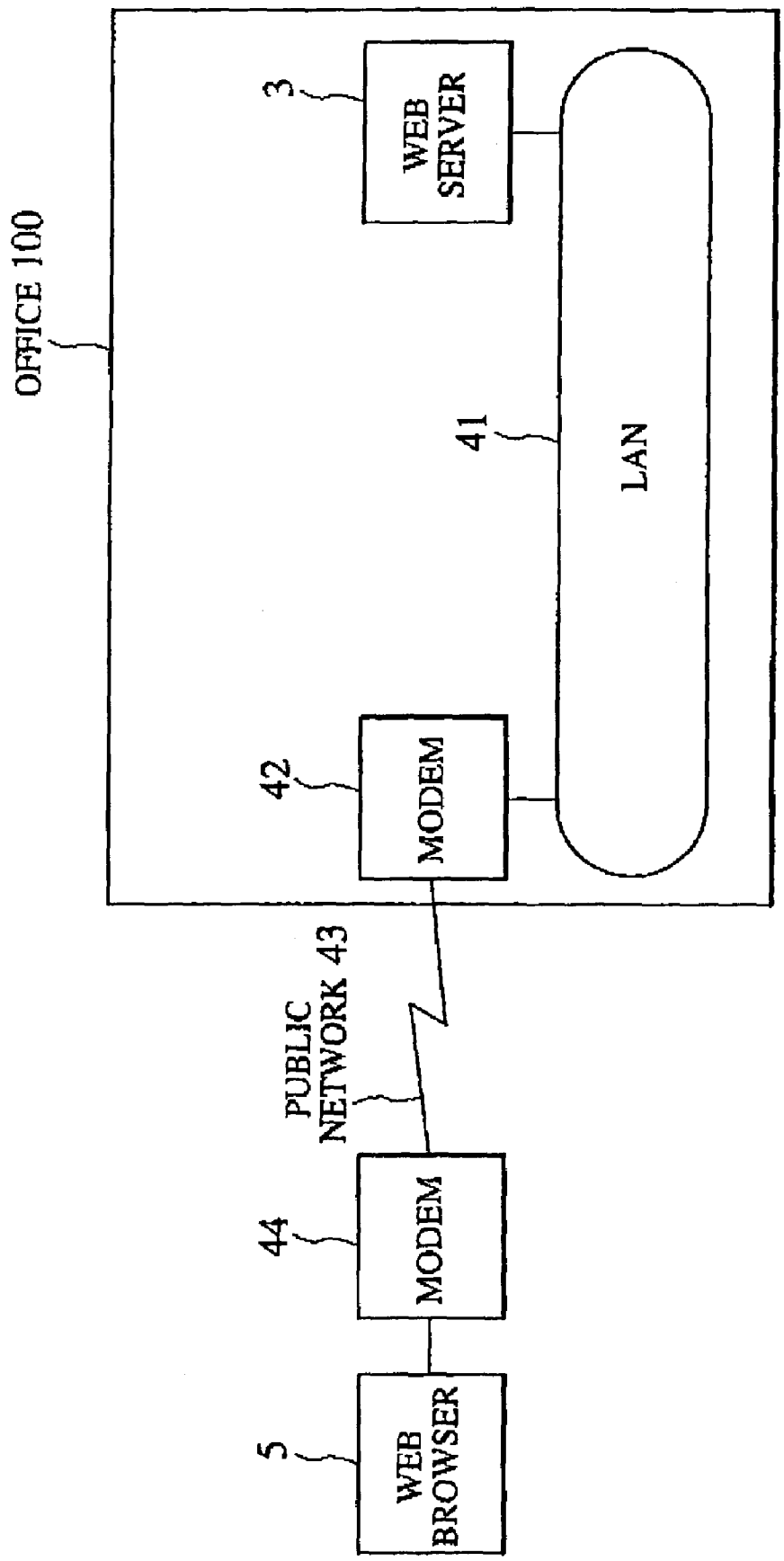
FIG. 1 is a block diagram showing one exemplary configuration of a computer network system to which a cache server according to one embodiment of the present invention can be provided.

FIG. 1 shows an exemplary configuration of a computer network system to which a cache server (data transfer device) according to one embodiment of the present invention can be provided.

In this exemplary configuration, a LAN 41 is provided inside an office 100 of a company, and a Web server 3 for providing prescribed services is connected to the LAN 41. A modem 42 is connected to this LAN 41, such that the connection to this LAN 41 can be made from an external of the office 100 by utilizing a public network 43 such as that of the telephone. A user can make a connection to the LAN 41 from the external via the public network 43 by utilizing the modem 44, and access the Web server 3 in the office 100 via the public network 43 by connecting a modem 44 and a Web browser 5.

Note that the Web browser 5 is operated on a device such as a portable PC, a portable telephone terminal having an information processing function, etc., used by the user (which will be generically referred to as a user terminal hereafter). The modem 44 can be provided in various forms, such as one to be externally attached to the user terminal as in the case of the portable PC, or one that is a built-in component of the user terminal as in the case of the portable telephone terminal. Also, the Web browser 5 can be a general purpose one or a one that is dedicated for the purpose of utilizing specific services.

Here, the user uses the Web browser 5 for the purpose of utilizing the services of the Web server 3. Namely, when the user operates the Web browser 5, a request message (which will be referred to as a request hereafter) is transferred from the Web browser 5 to the Web server 3, a response message (which will be referred to as a response hereafter) is transferred from the Web server 3 to the Web browser 5, and a display and other processing of the data of the received response are carried out at the Web browser 5, or such a series of operations are repeated according to the need.

Now, in such a configuration, conventionally, the communication speed of the public network 43 that connects the modem 44 connected or built-in in the user terminal and the modem 42 of the office 100 is slower than the communication speed of the LAN 41 inside the office 100, so that the public network 43 can become a bottleneck of the performance that can cause the communication delay and give rise to the problem of the lower response or throughput in the case where the user accesses the data or service provided by the Web server 3 by using the Web browser 5.

For this reason, in this embodiment, as shown in FIG., 2, a cache server 1 is provided between the LAN 41 and the modem 42 inside-the office 100, and the data transfer scheme among the Web server 3, the cache server 1, and the Web browser 5 on the user terminal as will be described below is realized by this cache server 1, such that the amount of communication data is reduced and the bottleneck of the public network 43 is resolved.

Figure 2:
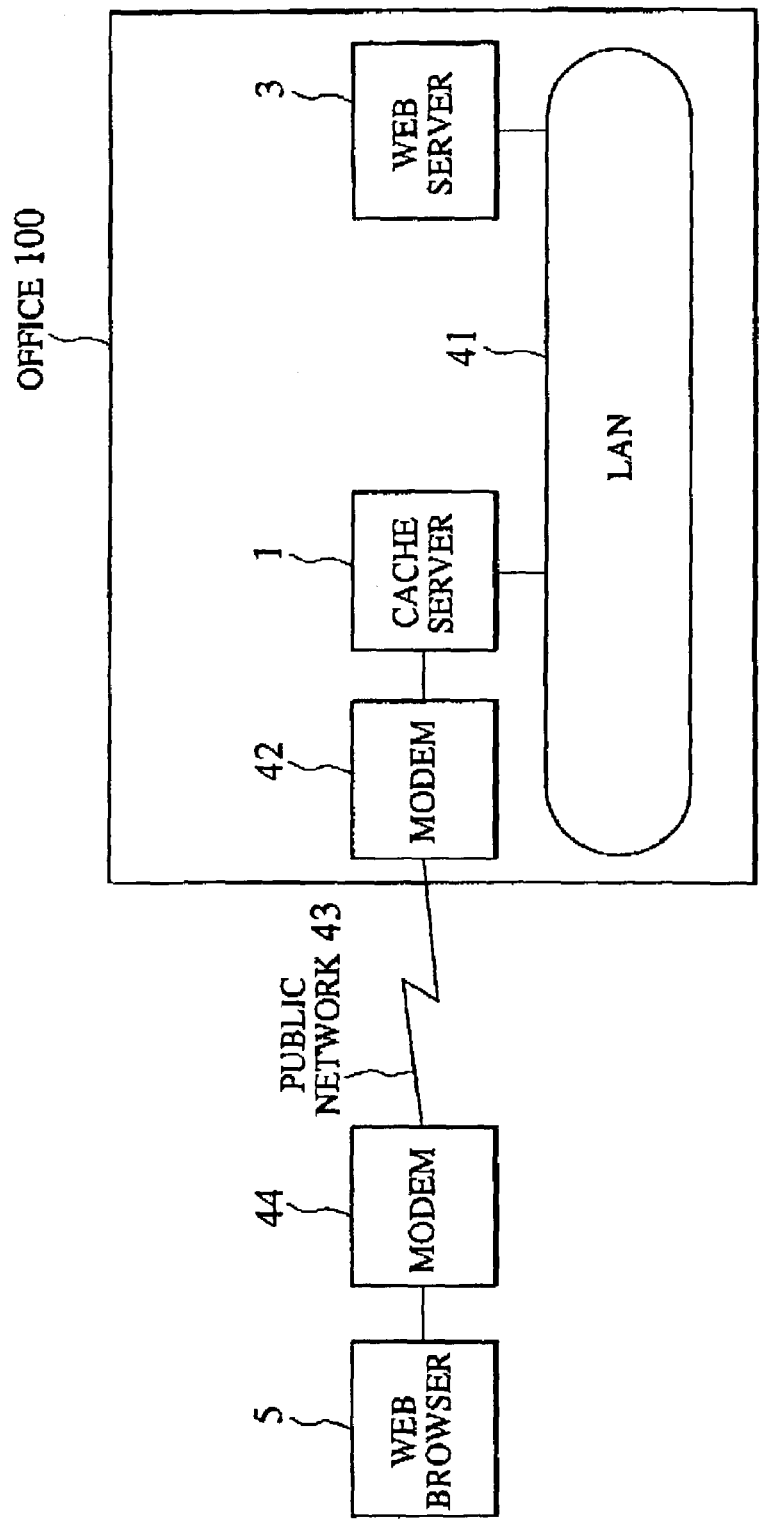
FIG. 2 is a block diagram showing one exemplary configuration of a computer network system in which a cache server according to one embodiment of the present invention is provided.
Figure 3:
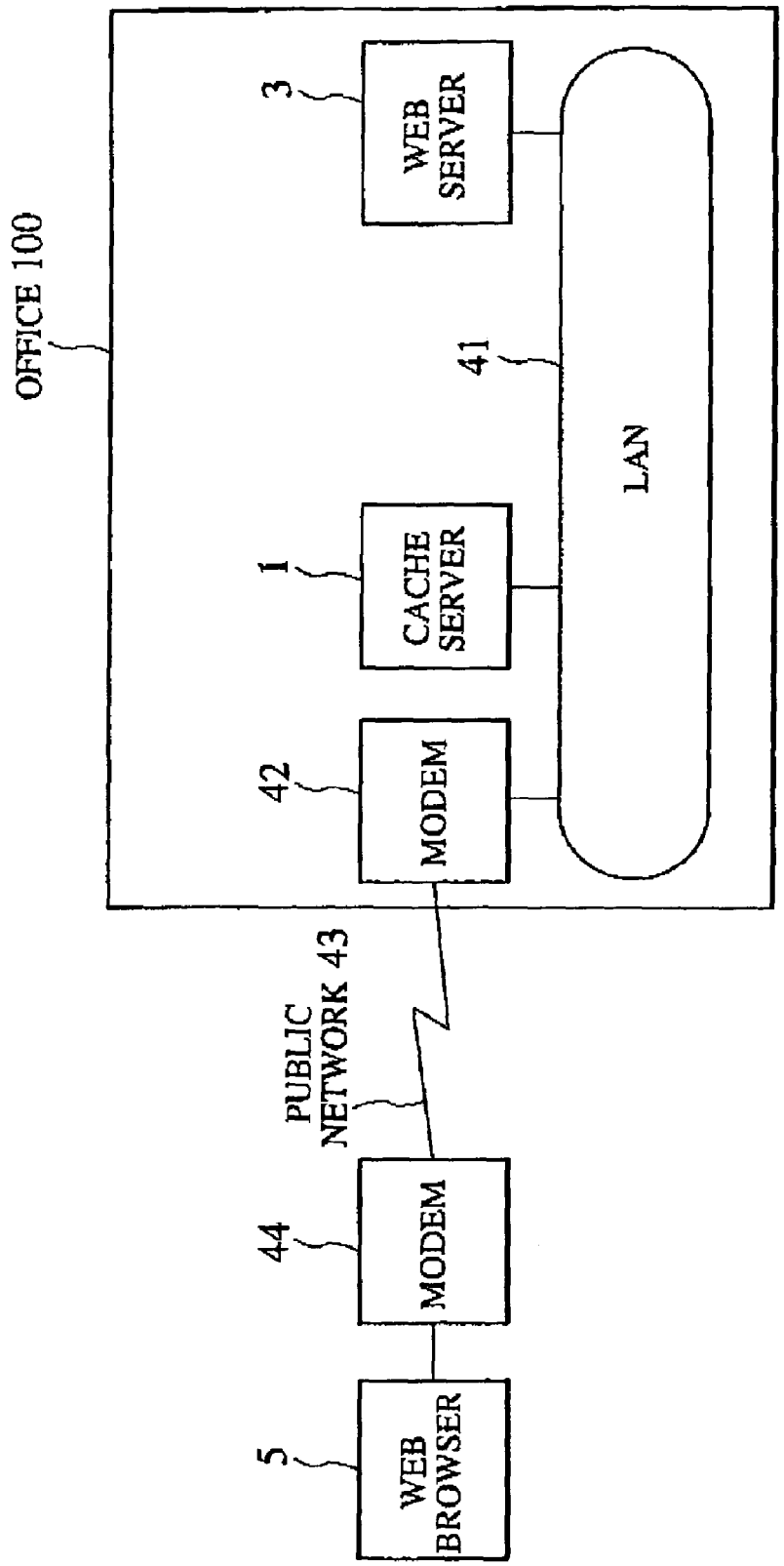
FIG. 3 is a block diagram showing another exemplary configuration of a computer network system in which a cache server according to one embodiment of the present invention is provided.

Note that, as a way of providing the cache server 1 of this embodiment, many variations are possible besides that shown in FIG. 2 in which it is provided between the LAN 41 and the Modem 42 on the office 100 side, such as a way of providing it as directly connected to the LAN 41 as shown in FIG. 3, and a way of implementing it on another node having prescribed functions (which can be the Web server 3) existing on the LAN 41, for example.

Each one of the cache server 1, the Web server 3 and the Web browser 5 of this embodiment can be realized in a form of operating software (cache program, server program, Web browser program) on a computer. In this case, software such as OS, driver software, packet communication software, encryption software, etc., having desired functions of the computer and hardware such as communication interface device, external memory device, input/output device, etc., are implemented or connected according to the need.

Also, in this case, it is preferable to use a graphical user Interface (GUI) in order to input information from the user or the manager and present information to the user. Of course, the each one of the cache server 1, the Web server 3 and the Web browser 5 can be realized by providing all or a part of its functions in a form of a chip which is incorporated into a prescribed device. Also, the Web browser 5 and the Web server 3 can be conventionally available ones.

In this embodiment, the exemplary case where the Web browser 5, the cache server 1 and the Web server 3 carry out communications according to the HTTP.1 which is the latest version of the HTTP will be described.

Note that, in this embodiment, the Web browser 5 is assumed to have a cache mechanism (which will be referred to as a browser cache hereafter). Namely, the cachable data among the data returned as a result of the information or service requested to the Web server 3 are cached in the browser cache in correspondence to its URL, and that data will be used when the user tries to access the information or service of the same URL later on, as long as it can be judged that the response data in the browser cache has not become obsolete.

Here, in this embodiment, the cache server 1 allocates an identifier for identifying its content to the response data received from the Web server 3. In this embodiment, the exemplary case of using the fingerprint (FP) as such an identifier will be described.

Figure 4:
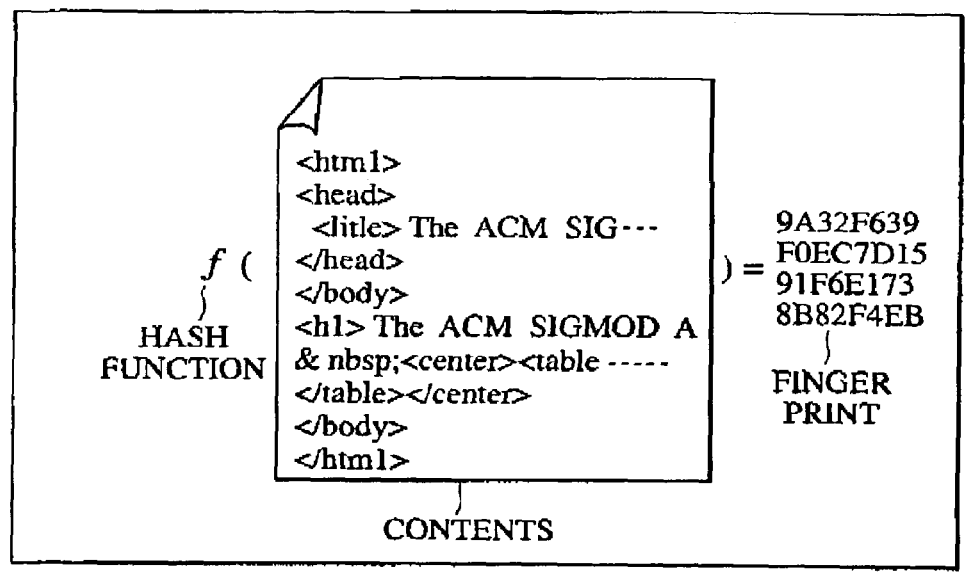
FIG. 4 is a diagram for explaining a fingerprint used in one embodiment of the present invention.

As shown in FIG. 4, the fingerprint value corresponding to one data (contents in the example of FIG. 4) is generated by applying a prescribed calculation method (a hash function in the example of FIG. 4) to the content of that data. The fingerprint value is a numerical value which is shorter than the original data. This numerical value may have a variable length, but the numerical value with a fixed length is easier to handle from a viewpoint of the ease of the processing.

As a method for calculating the fingerprint, it is possible to use the well known hash function such as MD-5, SHA-1, etc. These hash functions are already in use for the electronic signature with respect to data, and they can convert arbitrary data given to them into a numerical value of 128 bits in the case of MD-5 or a numerical value or 160 bits in the case of SHA-1. The characteristic of these hash function is that, when two data X1 and X2 are given and the data X1 and the data X2 are identical, the hash value calculated with respect to the data X1 and the hash value calculated with respect to the data X2 will be the same, but when two different data A and B are given, the hash value calculated with respect to the data A and the hash value calculated with respect to the data B will be different at a very high probability (there is a possibility for the hash values calculated with respect to two different data A and B to be the same in principle, but that possibility is negligibly small in practice).

Figure 5:
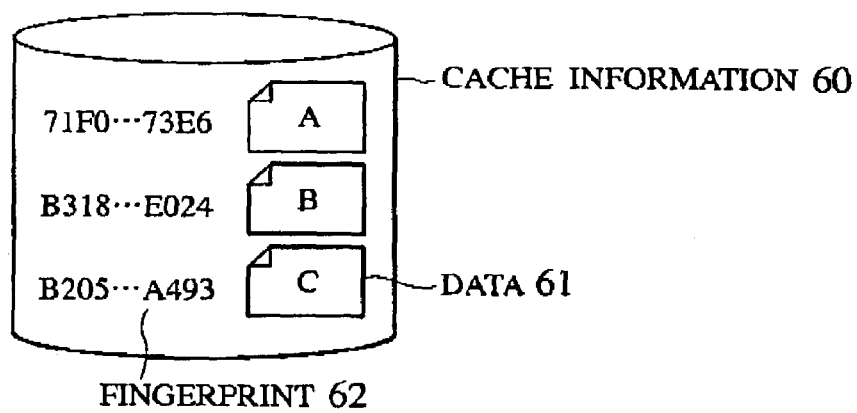
FIG. 5 is a diagram for explaining a fingerprint used in one embodiment of the present invention.

In this embodiment, in short, as shown in FIG. 5, the cache server 1 (a data management unit to be described below) records and manages a data body (61 in FIG. 5) contained in the body of the response to be transferred to the Web browser 5 (or the entire response containing that data) and the fingerprint value (62 in FIG. 5) obtained by the calculation from that data, in correspondence, as a cache information (60 in FIG. 5).

Then, even in the case where the data body would be transferred from the Web server 3 side to the Web browser 5 side conventionally (as there is no cache server 1), the cache server 1 produces a re-direct response message (which will be referred to as a re-direct response hereafter) containing the corresponding fingerprint and the own host name and transfers it to the Web browser 5.

Here, if the corresponding data exists in the browser cache of the Web browser 5 that received the re-direct response, the data in the browser cache is utilizable, so that there is no need to transfer the data body from the cache server 1 to the Web browser 5. In particular, in the case of FIG. 2, there is no need to transfer the data body through the public network 43 which has the slower communication speed than the LAN 41. Then, only in the case where the corresponding data does not exist in the browser cache of the Web browser 5 that received the re-direct response, the corresponding data body is transferred from the cache server 1 to the Web browser 5.

In the following, this embodiment will be described in further detail.

Figure 6:
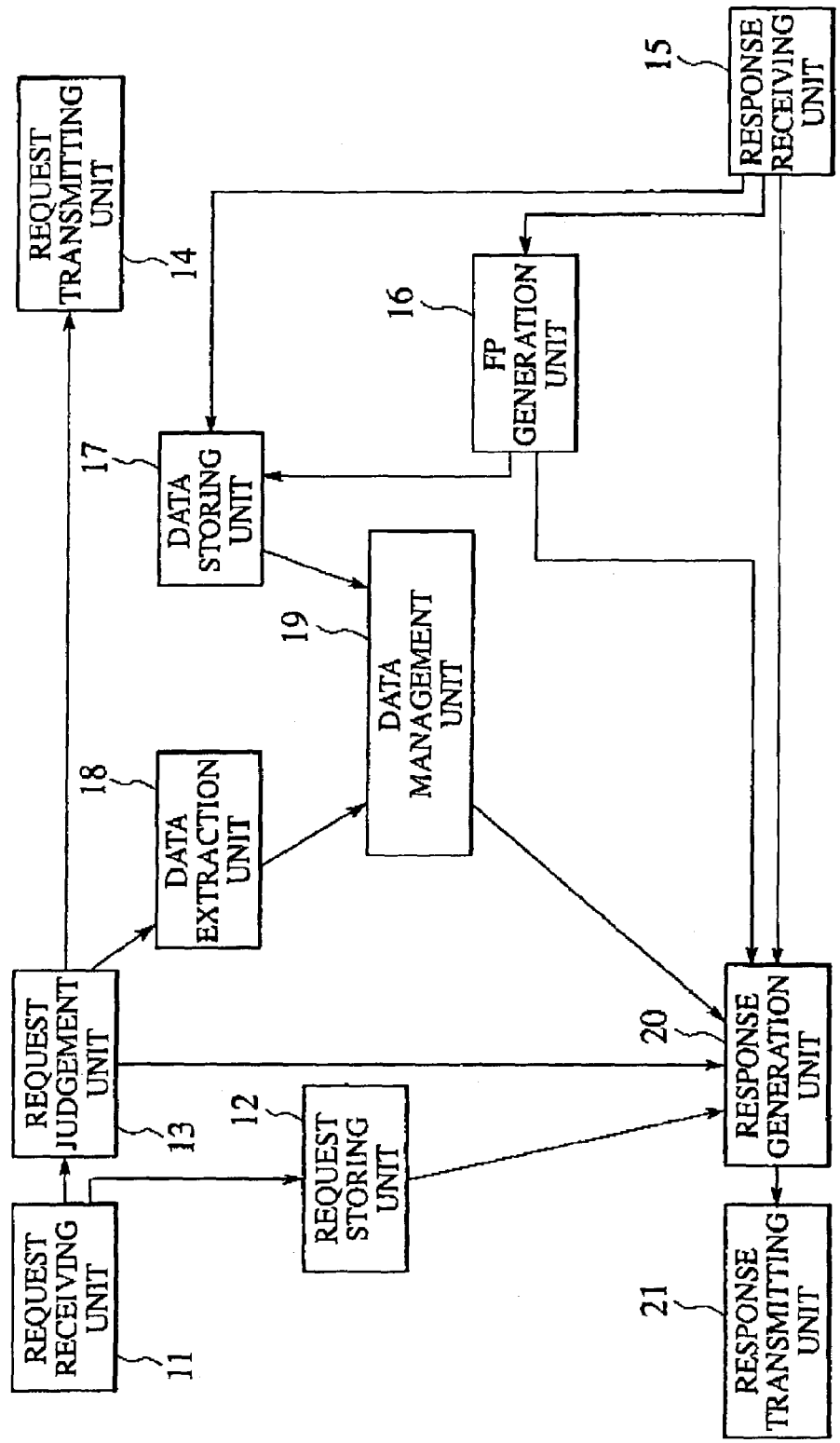
FIG. 6 is a block diagram showing an exemplary configuration of a cache server according to one embodiment of the present invention.

FIG. 6 shows an exemplary configuration of the cache server 1 according to this embodiment.

In this exemplary configuration, the cache server 1 has a request receiving unit 11, a request storing unit 12, a request judgement unit 13, a request transmitting unit 14, a response receiving unit 15, an FP generation unit 16, a data storing unit 17, a data extraction unit 18, a data management unit 19, a response generation unit 20, and a response transmitting unit 21. The outlines of these constituent elements of the cache server 1 are as follows.

The request receiving unit 11 receives the request from the Web browser 5.

The request storing unit 12 stores the request received by the request receiving unit 11.

The request judgement unit 13 refers to the URL contained in the request received from the request receiving unit 11, and judges whether this request should be transferred to the Web server 3 or the response should be generated inside the cache server 1 and transmitted to the Web browser 5 without transferring the request. Then, when it is judged that the request should be transferred, the transmission of the request is commanded to the request transmitting unit 14, or otherwise the extraction of the stored response is commanded to the data extraction unit 18, and the generation of the response to be transmitted to the Web browser 5 according to (the response data contained in the body of) the extracted response is commanded to the response generation unit 20.

The request transmitting unit 14 transmits the request to the Web server 3 when the request judgement unit 13 judged that the request should be transferred to the Web server 3.

The response receiving unit 15 receives the response from the Web server 3.

The FP generation unit 16 receives the response received by the response receiving unit 15 as an input, and generates the fingerprint corresponding to the response data contained in the body of that response.

The data storing unit 17 receives the response received by the response receiving unit 15 and the fingerprint generated by the FP generation unit 16, and commands the data management unit 19 to store them in correspondence.

The data extraction unit 18 commands the data management unit 19 to extract the response corresponding to the fingerprint, according to a command of the request judgement unit 13.

The data management unit 19 stores the fingerprint and the response in correspondence, according to a command of the data storing unit 17. Also, the data management unit 19 receives the fingerprint as an input, and outputs the response corresponding to it, according to a command of the data extraction unit 18.

The response generation unit 20 receives the response received by the response receiving unit 15, the fingerprint generated by the FP generation unit 16, and the request stored by the request storing unit 12, and generates the re-direct response to be transmitted to the Web browser 5. Also, the response generation unit 20 generates the response to be transmitted to the Web browser 5, according to the response received from the data management unit 19 and a command of the request judgement unit 13.

The response transmitting unit 21 transmits the response received from the response generation unit 20, to the Web browser 5.

Note that, in the data management unit 19, it is also possible to store the fingerprint and the response data portion of the response in correspondence, instead of storing the fingerprint and the response in correspondence.

Figure 7:
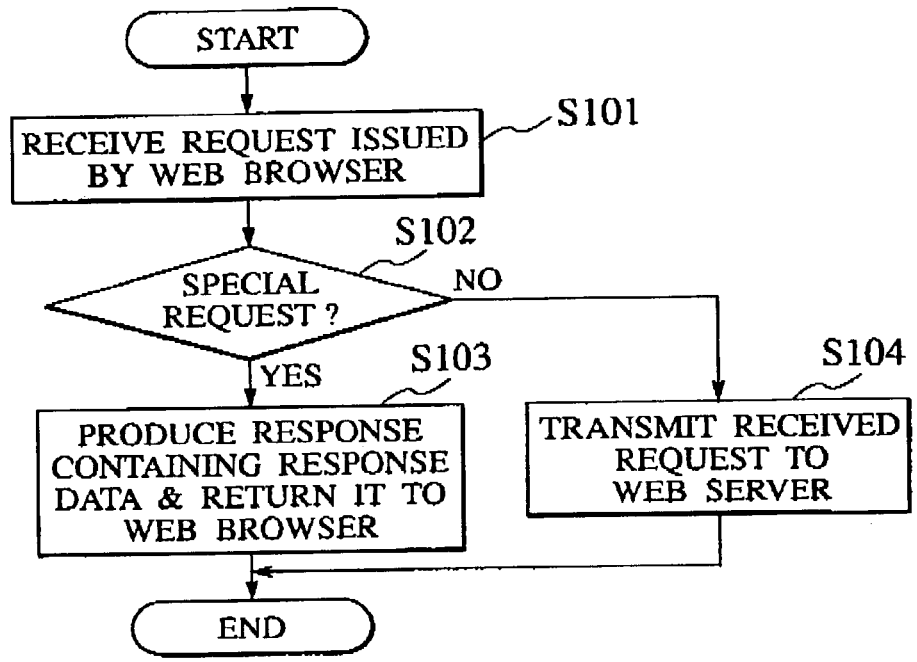
FIG. 7 is a flow chart showing an exemplary processing procedure in the case where the cache server according to one embodiment of the present invention receives a request from a Web browser.

FIG. 7 shows an exemplary schematic processing procedure in the case where the cache server 1 receives the request from the Web browser 5.

The request from the Web browser 5 is received (step S101), and whether the received request is a special request or not is checked, as will be described in detail below (step S102). If it is not a special request (step S102 NO), the received request is transmitted to the Web server 3 (step S104). On the other hand, if it is a special request (step S102 YES), the request containing the corresponding response data is generated and returned to the Web browser 5 (step S103).

Figure 8:
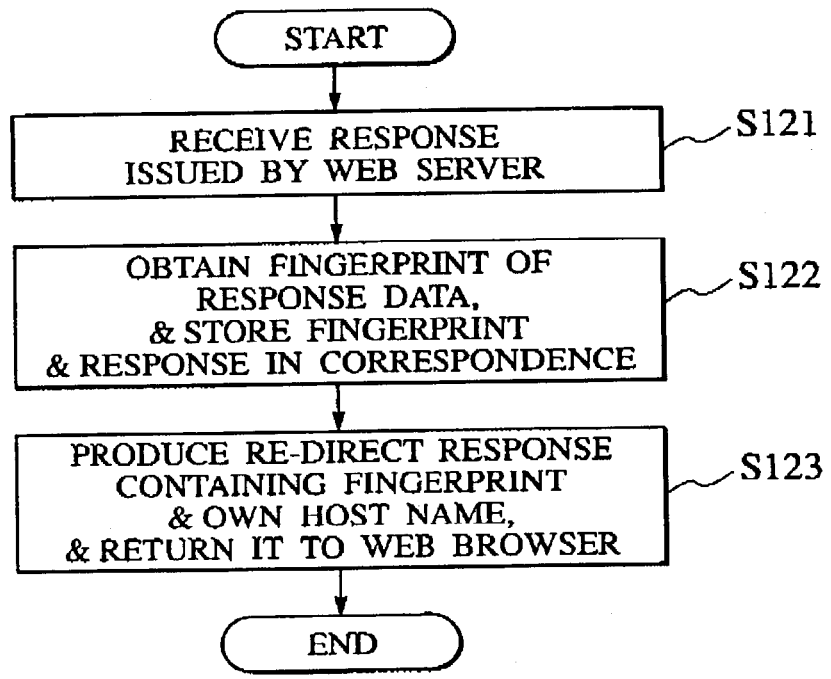
FIG. 8 is a flow chart showing an exemplary processing procedure in the case where the cache server according to one embodiment of the present invention receives a response from a Web server.

FIG. 8 shows an exemplary schematic processing procedure in the case where the cache server 1 receives the response from the Web server 3.

The response from the Web server 3 is received (step S121), and the fingerprint for the response data of the received response is obtained, and then the fingerprint and the response are stored in correspondence (step S122). Then, the re-direct response containing the fingerprint and the own host name is generated and returned to the Web browser 5 (step S123).

Next, the data transfer and the processing flow among the Web browser 5, the cache server 1 and the Web server 3 in this embodiment will be described in further detail.

Figure 9:
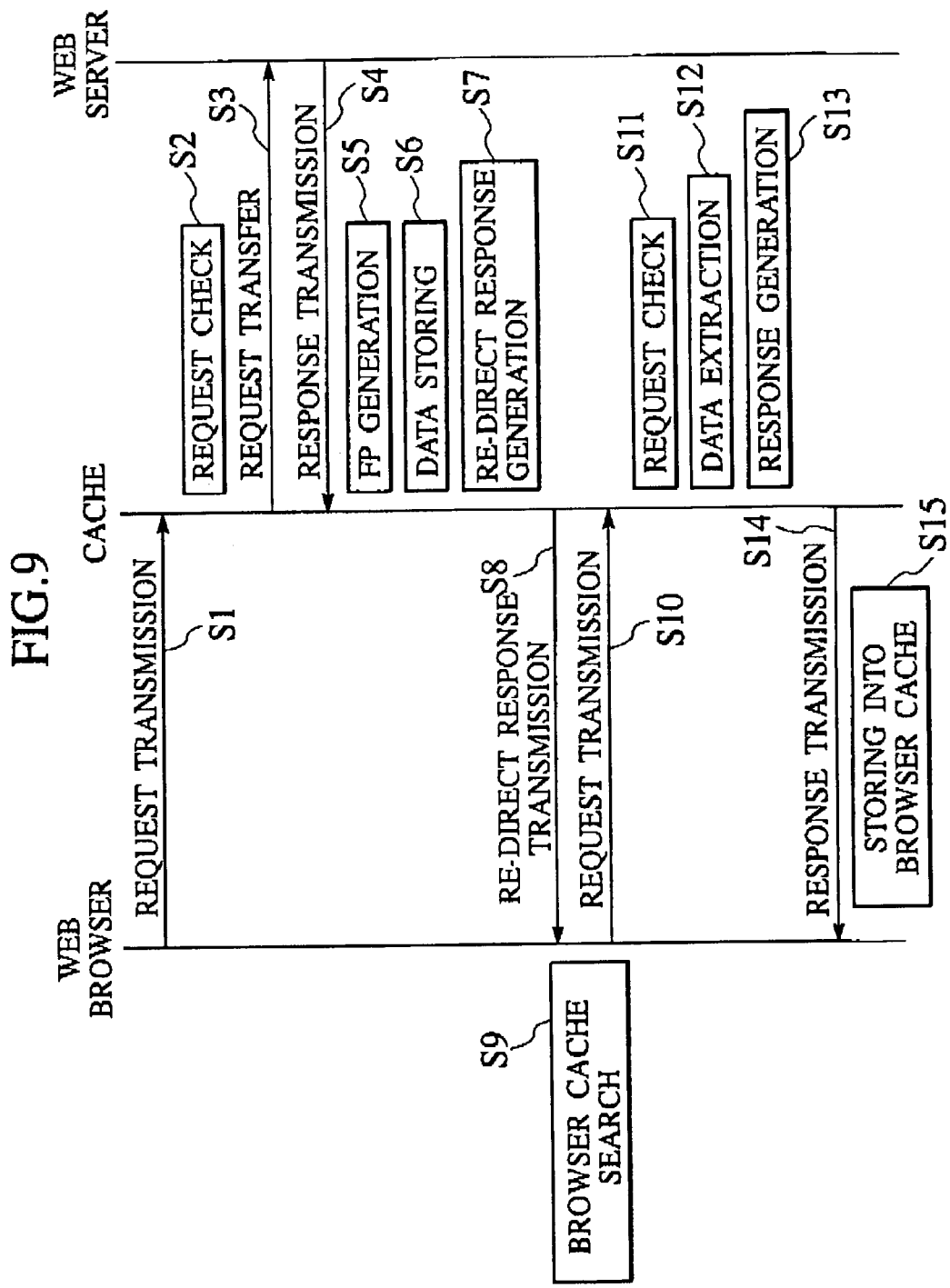
FIG. 9 is a sequence chart showing a processing flow when a request for one URL is issued for the first time in the computer network system according to one embodiment of the present invention.

FIG. 9 shows an exemplary processing sequence in the case where the Web browser 5 issues the request with respect to one URL for the first time, and acquires the response corresponding to it.

First, the Web browser 5 transmits the request, which is triggered by an operation by the user (step S1). Then, the request is transferred to the public network 43, and received by the cache server 1 (step S1). As described above, the request of the HTTP comprises a request header and a request body, and the request header contains a method and a URL.

Here, as a concrete example, it is assumed that the method is the GET method and the URL is:

http://www.office.com/index.html

Note that, in the case of the GET method, the request body is usually empty, so that it is assumed that the request body is empty in the following description.

At the cache server 1 that received the request from the Web browser 5, the request receiving unit 11 of FIG. 6 receives this request, and gives its content to the request judgement unit 13, and also gives it to the request storing unit 12 to store the content of the request.

The request judgement unit 13 checks the URL in the request header, and determines whether this request should be transferred to the Web server 3 or not, according to the content of the URL (step S2). Note that, as will be described in detail below, for the request with respect to the specific URL, the cache server 1 does not transfer the request to the Web server 3 but generates the response inside the cache server 1 and transmits the response to the Web browser 5, whereas for the request with respect to a URL other than the specific URL, the cache server 1 transfers the request to the Web server 3. Here, the URL contained in the request is:

http://www.office.com/index.html and this is not the specific URL, so that the request judgement unit 13 determines to transfer the request to the Web server 3, and gives the content of the request to the request transmitting unit 14. Then, the request transmitting unit 14 transfers the request to the Web server 3 (step S3).

When this request is received (step S3), the Web server 3 carries out the processing according to that request. Then, the data obtained as a result of the processing is mounted on the response and the response is transmitted (step S4). Then, the response is received by the cache server 1 (step S4).

Here, the request of this time is requesting the data of a HTML document existing on the Web server 3. Here it is assumed that this HTML document is stored as a file on the Web server 3 in the state of being produced in advance. In this case, the Web server 3 reads out the data from the file, and transmits the response formed by the response header containing the status code "200" and the response body containing the data of the HTML document read out from the file, to the cache server 1.

When the response from the Web server 3 is received by the response receiving unit 15, the cache server 1 transmits that response to the FP generation unit 16, where the fingerprint for identifying the content of the response is generated (step S5). Here, it is assumed that the fingerprint value is "01234567890abcdefghijklmnopqrstu", for example.

Next, the response received by the response receiving unit 15 and the fingerprint generated by the FP generation unit 18 are given to the data storing unit 17, and the data storing unit 17 commands the data management unit 19 to store them in correspondence. The data management unit 19 stores them in correspondence (step S6). The fingerprint value this time is "01234567890abcdefghijklmnopqrstu", so that this value and the content of the entire response are stored in correspondence.

Next, the cache server 1 generates the re-direct response at the response generation unit 20 (step S7).

As described above, in the case where the first digit of the status code of the response is "3", it indicates the re-direction. Here, it is assumed that the status code "302" is to be returned.

Also, it is assumed that the URL to be specified in the Location header is:

http://(host name)/(fingerprint value).(suffix)

which is formed by the three elements: the host name of the cache server, the fingerprint value for the response from the Web server, and the suffix of the URL contained in the request from the Web browser.

Assuming that the host name of the cache server 1 is determined in advance, the fingerprint value for the response from the Web server 3 is already generated by the FP generation unit 16, and the suffix of the URL contained in the request from the Web browser 5 can be extracted from the request stored in the request storing unit 12, so that the response generation unit 20 can generate this URL, by receiving information from the FP generation unit 16 and the request storing unit 12 (and consequently it is possible to generate the re-direct response).

Here, as a concrete example, it is assumed that the host name of the cache server 1 is "cache.office.com", then this URL becomes:

http://cache.office.com/01234567890abcdefghijklm-nopqrstu.html and the response header of the response to be generated becomes:

Location:http://cache.office.com/01234567890abcdef-ghijklmnopqrstu.html

Then, the response transmitting unit 21 transmits the generated re-direct response to the Web browser 5 (step S8).

The Web browser 5 receives the response containing the status code "302" (step S8).

Here, whether the response corresponding to the URL specified by the received re-direct response is cached or not is checked by searching through the browser cache of the Web browser 5 (step S9), and if it is cached, the data of the response can be acquired from the browser cache and utilized, but this time, (as it is the case where the request with respect to one URL is issued for the first time) it is assumed that the corresponding response does not exist in the browser cache of the Web browser 5, so that the request with respect to the URL specified in the Location header is transmitted again (step S10).

In this case, the method of the request initially transmitted is the GET method, so that the Web browser 5 specifies the same GET method as the method and:

http://cache.office.com/01234567890abcdefghijklm-nopqrstu.html that is specified in the Location header of the response received earlier as the URL in the request, and transmits the request to the cache server 1.

Note that, according to the HTTP1.1 specification, when the response containing the status code "302" comes back in response to the request, the caching of this response containing the status code "302" is prohibited, except for the case where it is indicated as cachable by the Expire header or the Cache-Control header. Here, it is assumed that the cache server 1 is not attaching such a header indicating that it is cachable to the response, so that the browser cache of the Web browser 5 does not cache this response.

At the cache server 1, the request receiving unit 11 receives this request (step S10), gives its content to the request judgement unit 13, and also gives it to the request storing unit 12 to store the content of the request.

The request judgement unit 13 checks the URL in the request header, and determines whether this request should be transferred to the Web server 3 or not (step S11).

The URL contained in the request this time is:

http://cache.office.com/01234567890abcdefghijklm-nopqrstu.html and the request judgement unit 13 does nor transfer the request for such a URL to the Web server 3 but carries out the processing different from the ordinary request as a special request.

Note that the judgement by the request judgement unit 13 as to whether the received request should be transferred to the Web server 3 or it should be treated as a special request can be made by extracting the host name portion of the URL, and checking whether that coincides with the predetermined host name of the cache server 1 (which is "cache.office.com" in this case) or not.

As described above, when the request is judged as a special request which should not be transferred to the Web server 3, this request is not transferred to the Web server 3 but the fingerprint contained in the URL is extracted, and the extraction of the response corresponding to this fingerprint is commanded to the data extraction unit 18. The data extraction unit 18 extracts the response corresponding to this fingerprint from the data management unit 19 (step S12).

Then, the response extracted from the data management unit 19 is given to the response generation unit 20, and the response having the same body (response data) as the stored response, that is the response having the same content as the HTML document existed on the Web server 3 as the body, is generated (step S13).

The generated response is transmitted to the Web browser 5 by the response transmitting unit 21 (step S14).

In this way, the response containing the data body is received by the Web browser 5 (step S14).

Then, this Web browser 5 has the browser cache, so that the received response is stored in the browser cache (step S15).

There are many methods for caching into the browser cache. For example, "URL contained in the request" and "content of the response to that request" are stored in correspondence. What is corresponding to this response of this time is the GET request for:

http://cache.office.com/01234567890abcdefghijklm-
      nopqrstu.html which was issued in order to deal with the re-direct response from the cache server 1. Consequently, this URL and the content of the response will be stored in correspondence, into the browser cache.

Next, the case where the GET request for:

http://www.cache.office.com/index.html is issued again from the same Web browser 5 will be described.

Figure 10:
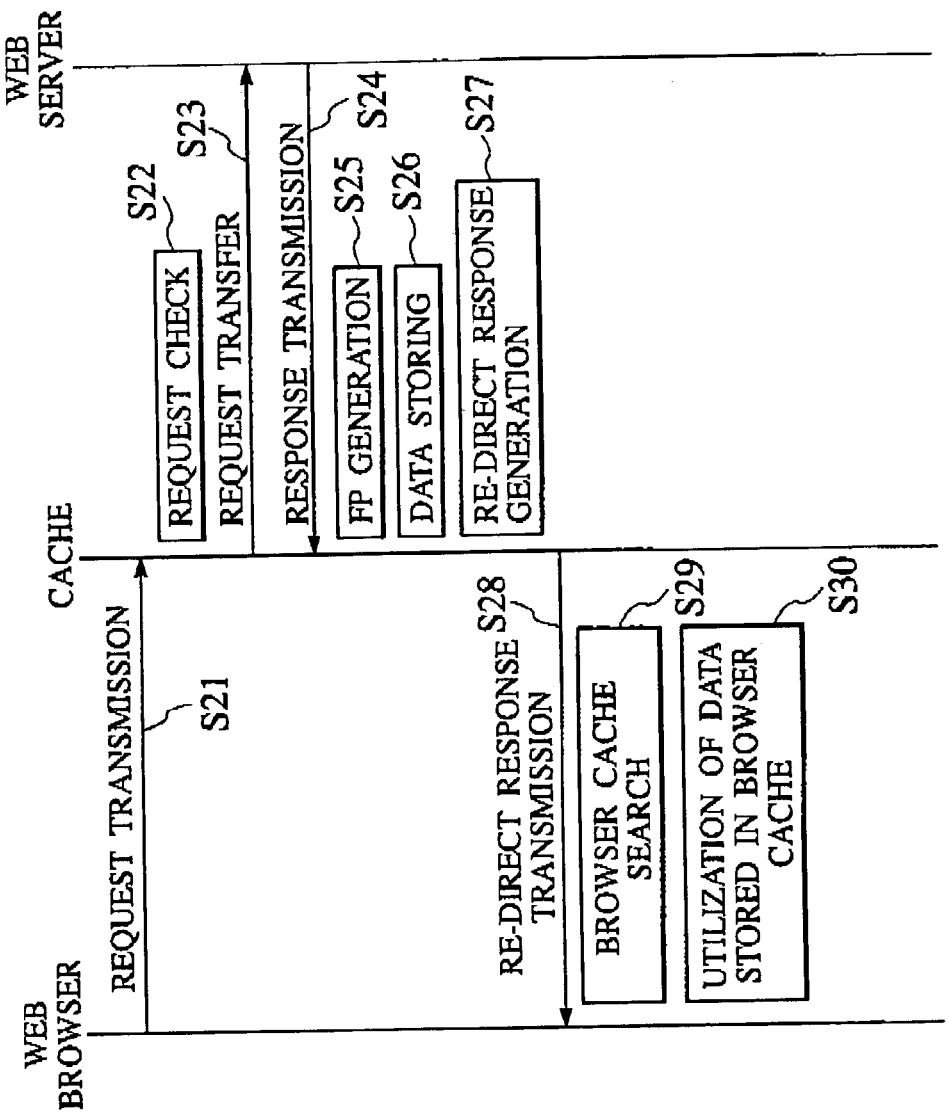
FIG. 10 is a sequence chart showing a processing flow when a request for the same URL is issued again in the computer network system according to one embodiment of the present invention.

FIG. 10 shows an exemplary processing sequence in this case.

When this case is compared with the case of FIG. 9 (the case where the request is issued for the first time), the step S21 of "request transmission" to the step S28 of "re-direct response transmissions" of FIG. 10 are the same processing flow as the step S1 to the step S8 of FIG. 9, and the content of the data contained in the body of the response transmitted at the step S24, the FP value generated at the step S25, the URL contained in the Location header of the re-direct response generated at the step S27 and transmitted at the step S28 of FIG. 10 are also identical to those of the steps S4, S5, S7 and S8 of FIG. 9. Namely, the same procedure is carried out as in the case of issuing the request for the first time, up to the point where the Web browser 5 receives the re-direct response.

However, the processing after the Web browser 5 receives the re-direct response is different from the case of FIG. 9 (the case where the request is issued for the first time).

Namely, as a result of receiving the re-direct response, the Web browser 5 tries to execute the GET for the URL:

http://cache.office.com/01234567890abcdefghijklm-
      nopqrstu.html

However, unlike the first time, a result of executing the GET for this URL is already stored in the browser cache of the Web browser 5.

Consequently, this time, when the Web browser 5 searches through the browser cache (step S29), the stored data is obtained, so that the this stored data is utilized as a result of the GET (without issuing the GET request for the specified URL) (step S30). For this reason, the processing flow ends at this point.

When the processing flows of FIG. 9 and FIG. 10 are compared, the HTML document is transferred as the body of the response between the cache server 1 and the Web browser 5 at the step S14 in FIG. 9, whereas the HTML document is not transferred between the cache server 1 and the Web browser 5 in FIG. 10. Namely, according to this embodiment, the data transfer becomes unnecessary in the second and subsequent times. This implies that the bottleneck existing between these two, that is the amount of data flowing through the public network 43 (which has the communication speed slower than the LAN 41) in the case of FIG. 2, is reduced, and this in turn implies that the bottleneck for the data transfer in the prior art described above with reference to FIG. 1 is resolved.

Now, the above description assumed that the service of the URL requested by the Web browser 5 is a static one that is stored as a file on the Web server 3 in a state of being produced in advance. In the following, the case where the service of the URL is a dynamic one will be described.

Here, as a concrete example, it is assumed that one program is located on the Web server 3, and the user can access the service provided by this program by issuing the GET request for the URL:

http://www.office.com/program.cgi

Then, in response to the request to this URL, one of two different types of data is to be transmitted as the response depending on the situation. In the following description, two types of data will be denoted as Data-A and Data-B, and the corresponding fingerprint values of these data will be denoted as FP-A and FP-B respectively.

First, suppose that the user issues the request for the service of the above described URL for the first time, and the Web server 3 returns the Data-A as a response. The fingerprint value generated by the FP generation unit 16 of the cache server 1 becomes FP-A, so that (assuming that the fingerprint value and the response data are stored in correspondence in the data management unit 19 here) the data management unit 19 stores the fingerprint and the response in correspondence as:

(FP-A, Data-A)

Also, the response generation unit 20 generates the re-direct response, and the URL:

http://cache.office.com/FP-A.cgi is specified in its Location header.

When the re-direct response is received, the Web browser 5 tries to execute the GET request for the above described URL, but before that, the Web browser 5 checks whether the response corresponding to the GET for this URL is already cached in the own browser cache or not. However, since it is the first time the access to this URL is made, the response is not cached, and consequently the request is transmitted to the cache server 1.

When the request for the above described URL is received, the cache server 1 extracts "Data-A" which is the response corresponding to "FP-A" which is the fingerprint value contained in the request, and transmits it as the response to the Web browser 5. The Web browser 5 stores this response in correspondence to the URL into the browser cache as:

(http://cache.office.com/FP-A.cgi, Data-A)

Next, consider the case where the GET request for:

http://www.office.com/program.cgi is issued from the same Web browser 5 after that. This request is transferred from the cache server 1 to the Web server 3, and in response the Web server 3 returns the response, but the content of this response can be Data-A or Data-B depending on the situation. In the following the processing flow for each case will be described.

First, when the Web server 3 returns Data-A as the response, the same processing as the first time is repeated up to the point where the re-direct response is transmitted from the cache server 1 to the Web browser 5. Namely, the URL:

http://cache.office.com/FP-A.cgi is specified in the Location header of the re-direct response.

Then, the Web browser 5 tries to execute the GET request for this URL, but there is an entry:

(http://cache.office.com/FP-A.cgi. Data-A)

in the browser cache of the Web browser 5 as a result of the first time. Therefore, the Web browser 5 utilizes this Data-A as the response for this request, instead of issuing the GET request.

On the other hand, when the Web server 3 returns Data-B as the response, an entry:

(FP-B, Data-B)

is produced in the data management unit 19 of the cache server 1, and the URL http://cache.office.com/FP-B.cgi is specified in the Location header of the re-direct response to be transmitted from the cache server 1 to the Web browser 5.

The Web browser 5 checks the browser cache before issuing the GET request for this URL, but an entry corresponding to the above described URL does not exist. Consequently, the GET request for the above described URL is actually transmitted to the cache server 1, and as a result, Data-B stored at the cache server 1 is transmitted as a response.

From the above, the Data-A stored in the browser cache of the Web browser 5 as a result of the first time access is re-utilized when the Web server 3 returns the Data-A as the response for the second time access, whereas the Data-B is transmitted as the response from the cache server 1 when the Web server 3 returns the Data-B as the response for the second time access. Namely, according to this embodiment, it becomes possible to cache the dynamic contents, which could not have been cached conventionally by using a cache memory that stores the URL and the response in correspondence such as the browser cache.

Now, the description up to this point is directed to the case of using only one Web server 3. However, in the actual World Wide Web system, it is more common to have the situation where a plurality of the Web servers are existing and each Web server is providing its services. For this reason, the case where a plurality or Web servers that are to be handled by a single cache server 1 are existing will be described.

Figure 11:
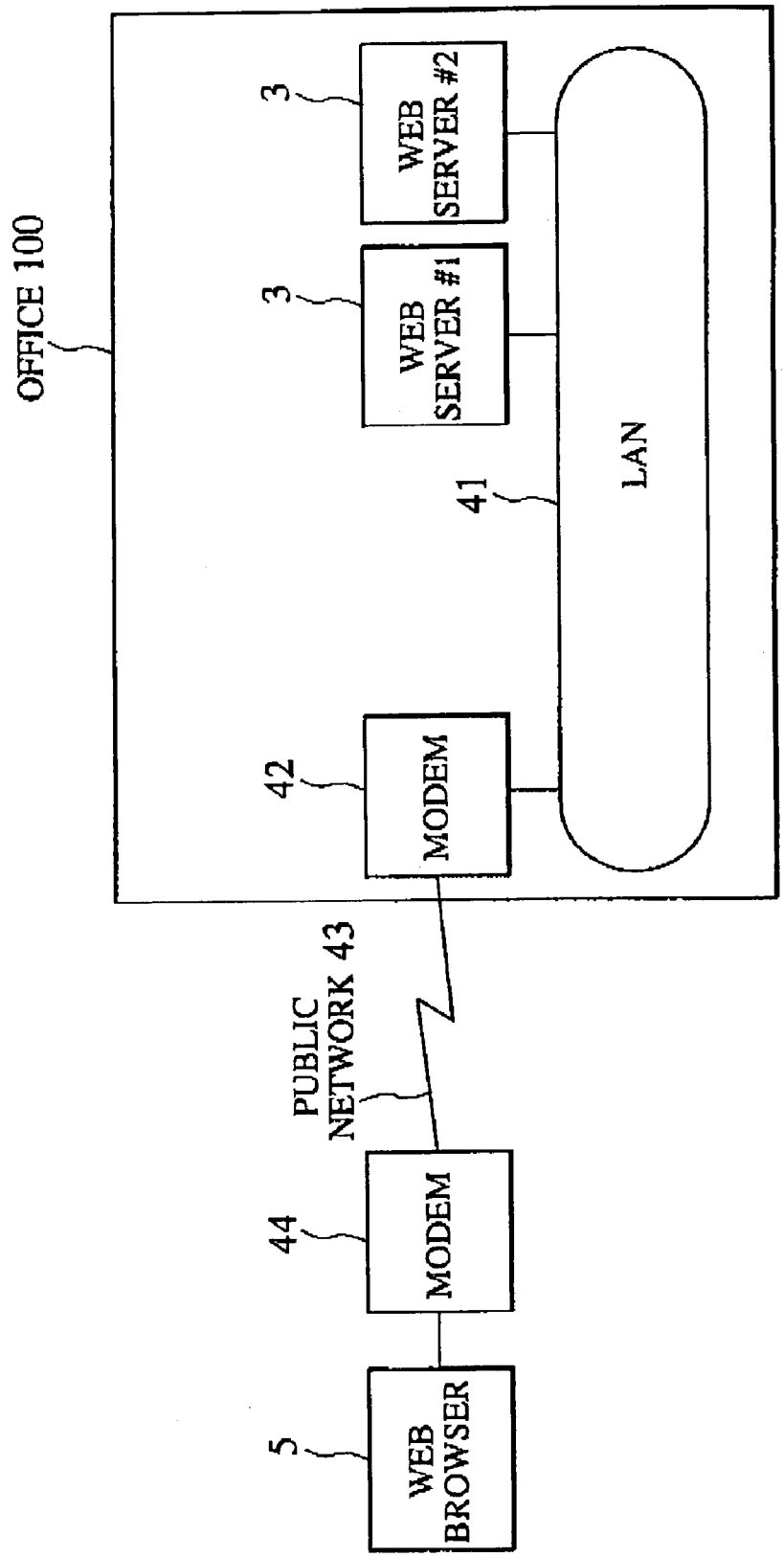
FIG. 11 is a block diagram showing another exemplary configuration of a computer network system to which a cache server according to one embodiment of the present invention can be provided.

First, the problems of the prior art will be described for an exemplary case where two Web servers 3 are existing on the LAN 41 as shown in FIG. 11.

When two Web servers exist as shown in FIG. 11, the same data are often stored at both of them, as in the case where the same image data are used as the screen images, for example. In this case, the data of the same content is provided at two different URLs. For example, when the host name of the Web server (#1) 3 is "www1.office.com", and the host name of the Web server (#2) 3 is "www2.office.com", the URLs for accessing the image data on these Web servers 3 are respectively:

http://www1.office.com/image-1.gif http://www2.office.com/image-2.gif

In such a situation, suppose that the Web browser 5 sequentially issued the GET requests for the above described two URLS. According to the prior art, the request is directly transmitted to the Web server 3, the response is directly transmitted to the Web browser 5, and the URL of the request and the content of the response are stored in correspondence in the browser cache. Denoting the contents of the responses in the case of accessing the above described two URLs as Data-1 and Data-2, two entries:

(http://www1.office.com/image-1.gif, Data-1)

(http://www2.office.com/image-2.gif, Data-2)

are generated in the browser cache.

However, the image data stored at these two URLs are the same, so that Data-1 and Data-2 are identical. Consequently, two entries:

(http://www1.office.com/image-1.gif, Data-1)

(http://www2.office-com/image-2.gif, Data-2)

are effectively existing in the browser cache, and this implies that the same Data-1 is stored in overlap, or that the same data that is already cached is not re-utilized efficiently.

Next, the case where the cache server 1 of this embodiment is provided at the LAN 41 of FIG. 11 as shown in FIG. 12 will be described. Note that, as already mentioned above, many variations are possible for a way of providing the cache server 1, such as a way of providing it as directly connected to the LAN 41 as shown in FIG. 3, and a way or implementing it on another node having prescribed functions (which can be the Web server 3) existing on the LAN 41, for example.

In the following, the processing flow in the case where the GET requests for the above described two URLs are sequentially issued in FIG. 12 will be described.

First, suppose that the request for the URL "http://www1.office.com/image-1.gif" is issued for the first time. The request transmitted from the Web server 5 to the cache server 1 is transferred from the cache server 1 to the Web server 3 of the host name "www1.office.com".

The Web server 3 returns "Data-1" as the response to the cache server 1. Denoting the fingerprint value generated by the FP generation unit 16 of the cache server 1 as FP-1, an entry:

(FP-1, Data-1)

is generated in the data management unit 19 of the cache server 1.

Then, the response generation unit 20 generates the re-direct response in which the URL:

http://cache.office.com/FP-1.gif is specified in the Location header, and the response transmitting unit 21 transmits this re-direct response to the Web browser 5.

The Web browser 5 checks whether the entry corresponding to this URL exists in the browser cache or not, before issuing the GET request for this URL. This time it is the first access so that the entry does not exist, and consequently the GET request is transmitted to the cache server 1.

The cache server 1 extracts Data-1 which is the response corresponding to FP-1, and transmits it as the response to the Web browser 5.

When this response is received, the Web browser 5 produces an entry:

(http://cache.office.com/FP-1.gif, Data-1)

in the browser cache.

Next, suppose that the request for the URL "http://www2.office.com/image-2.gif" is issued for the first time. This time the request is transferred from the cache server 1 to the Web server 3 of the host name "www2.office.com".

Since the contents of the image data stored at the two URLs are identical, the Web server 3 returns Data-1 as the response. Consequently, the FP generation unit 16 of the cache server 1 generates FP-1 as the fingerprint for this response, and the response generation unit 20 generates the re-direct response in which the URL:

http://cache.office.com/FP-1.gif is specified in the Location header.

When this re-direct response is received, the Web browser 5 checks whether the entry corresponding to this URL exists in the browser cache or not, before issuing the GET request for this URL. This time, the entry:

(http://cache.office.com/FP-1.gif, Data-1)

is already generated in the browser cache when the GET request for "http://www1.office.com/image-1.gif" was issued earlier. Consequently, the Web browser 5 utilizes "Data-1" stored in the browser cache as the response, instead of issuing the request.

From the above, the data stored in the browser cache of the Web browser 5 as the response to the first time request is re-utilized even though the second time request is for a different URL. Namely, according to this embodiment, it becomes possible to cache the data efficiently even in the case which could not have been handled conventionally by using a cache memory that stores the URL and the response in correspondence such as the browser cache.

Now, in the data management unit 19 of the cache server 1, there is usually an upper limit to the capacity for storing the cache information, so that it is also possible to carry out the garbage collection according to a prescribed algorithm in order to successively delete old data or data that are unlikely to be used, for example.

Note however that, in this case, if the corresponding set of the fingerprint and the data is deleted from the data management unit 19 immediately after transmitting the re-direct response containing the fingerprint and the own host name to the Web browser 5 at the cache server 1, it would become such that the corresponding set of the fingerprint and the data no longer exist in the data management unit 19 of the cache server 1 even when the Web browser 5 that received the above described re-direct response from the cache server 1 transmits the request to the cache server 1 again, for example. Consequently, regardless of the algorithm to be used, it is preferable not to delete the corresponding set of the fingerprint and the data until at least a prescribed period of time has elapsed since the re-direct response is transmitted from the cache server 1 to the Web browser 5.

Also, the fingerprint for data A of one response and the fingerprint for data B (which is assumed to be different from the data A) of another response can possibly coincide at a very low probability, and when there is a need to avoid an error due to this situation, it is possible to use the method in which, each time the response is received at the cache server 1, if there is a data stored in the data management unit 19 in correspondence to the fingerprint for the data of the received response, that data and the data of the received response are compared and whether the non-coincidence of the data occurs or not is checked. When the non-coincidence of the data occurs, it can be handled by any one of the following methods, for example.

The subsequent use of that fingerprint is prohibited (the data that gives that fingerprint will not be cached subsequently).

The fingerprint/data that is registered earlier is given a higher priority (the other data that gives the same fingerprint value as the registered fingerprint will not be cached while the registered fingerprint remains registered).

The fingerprint/data that is the current registration target is given a higher priority (the registered fingerprint/data will be successively updated by the other data that gives the same fingerprint value).

Note that the above description uses an exemplary case of carrying out communications between the Web server on the LAN inside the company office and the Web browser (user terminal), through the modem and the public network that becomes the bottleneck for the communications with the LAN, but of course the present invention is also applicable to any of a LAN other than that or the company office, a device other than a Web server such as a server for providing data, a device other than a Web browser such as a client that receives the data providing service, any type of the public network, and a communication device other than a modem.

As described, according to the present invention, when the response message containing the response data is received from the second communication device, an identifier to be allocated to the response data contained in the response message is generated according to the content of the response data, and at least the response data and the identifier are stored in correspondence. Then, a re-direct response message for re-directing to a prescribed URL containing the identifier is transmitted to the first communication device, instead of transmitting the response message containing the response data. When the request message for the prescribed URL containing the identifier is received from the first communication device, the response message containing the response data that is stored in correspondence to the identifier contained in the URL is transmitted to the first communication device.

If the first communication device has a built-in cache (a browser cache, for example), when the re-direct response message for redirecting to the prescribed URL containing the identifier is transmitted to the first communication device, the request message for the prescribed URL containing the identifier is received from the first communication device, and the response message containing the response data that is stored in correspondence to the identifier contained in the URL is transmitted to the first communication device, the response is stored in the built-in cache. Thereafter, for the same response data, it suffices to only transmit the re-direct response message for re-directing to the prescribed URL containing the identifier from the data transfer device to the first communication device. In this way, the data transfer amount for the response data from the data transfer device to the first communication device can be reduced.

Thus, according to the present invention, it becomes possible to reduce the load on a network that connects one communication device on which the Web browser or the like is implemented and the data transfer device.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the cache server of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data transfer device for receiving a request message transmitted from a first communication device through a network and transferring the request message to a second communication device, and receiving a response message containing a response data returned from the second communication device that received the request message and transferring the response message to the first communication device, the data transfer device comprising:

a first receiving unit configured to receive the request message transmitted from the first communication device;

a first transmission unit configured to transmit the request message to the second communication device when the request message is one that should be transferred to the second communication device;

a second receiving unit configured to receive the response message containing the response data returned from the second communication device;

an identifier generation unit configured to generate an identifier to be allocated to the response data contained in the response message, according to a content of the response data;

a memory unit configured to store at least the response data and the identifier in correspondence; and a second transmission unit configured to transmit to the first communication device a re-direct response message for re-directing the first communication device to a URL containing the identifier, instead of transmitting the response message containing the response data, when the response message containing the response data is received from the second communication device, and transmit the response message containing the response data stored in the memory unit in correspondence to the identifier contained in the URL when the request message for the URL containing the identifier is received from the first communication device through the first receiving unit.

2. The data transfer device of claim 1, further comprising:

a judgement unit configured to judge whether the request message received from the first communication device by the first receiving unit is one that should be transferred to the second communication device or not.

3. The data transfer device of claim 2, wherein the judgement unit judges the request message as not one that should be transferred to the second communication device when the request message received from the first communication device is for the URL containing the identifier, and the request message as one that should be transferred to the second communication device otherwise.

4. The data transfer device of claim 1, wherein the second transmission unit uses the URL which is generated by using a host name of the data transfer device and the identifier allocated to the response data.

5. The data transfer device of claim 1, wherein the identifier generation unit generates the identifier as a value obtained by compressing the response data by a prescribed method.

6. The data transfer device of claim 5, wherein the identifier generation unit generates the identifier as a value obtained by applying a hash function to the response data.

7. The data transfer device of claim 1, wherein the data transfer device is connected to a local area network to which one or a plurality of second communication devices to be handled by the data transfer device are connected.

8. The data transfer device of claim 1, wherein the data transfer device is connected to a local area network which is connected with the network having a communication speed slower than the local area network.

9. The data transfer device of claim 1, wherein the data transfer device is connected with the first communication device which is a user terminal capable of activating a Web browser, and the second communication device which is a Web server.

10. The data transfer device of claim 1, wherein the data transfer device is connected with the first communication device which is a portable PC with a built-in communication device or an externally attached communication device, or a portable telephone terminal with an information processing function.

11. A data transfer method for receiving a request message transmitted from a first communication device through a network and transferring the request message to a second communication device, and receiving a response message containing a response data returned from the second communication device that received the request message and transferring the response message to the first communication device, the method comprising:
- receiving the request message transmitted from the first communication device;
- transmitting the request message to the second communication device when the request message is one that should be transferred to the second communication device;
- receiving the response message containing the response data returned from the second communication device;
- generating an identifier to be allocated to the response data contained in the response message, according to a content of the response data;
- storing at least the response data and the identifier in correspondence in a memory; and
- transmitting to the first communication device a re-direct response message for re-directing the first communication device to a URL containing the identifier, instead of transmitting the response message containing the response data, when the response message containing the response data is received from the second communication device, and transmitting the response message containing the response data stored in the memory in correspondence to the identifier contained in the URL when the request message for the URL containing the identifier is received from the first communication device.

12. A computer program product for causing a computer to function as a data transfer device for receiving a request message transmitted from a first communication device through a network and transferring the request message to a second communication device, and receiving a response message containing a response data returned from the second communication device that received the request message and transferring the response message to the first communication device, the computer program product comprising:

- a first computer program code for causing the computer to receive the request message transmitted from the first communication device;
- a second computer program code for causing the computer to transmit the request message to the second communication device when the request message is one that should be transferred to the second communication device;
- a third computer program code for causing the computer to receive the response message containing the response data returned from the second communication device;
- a fourth computer program code for causing the computer to generate an identifier to be allocated to the response data contained in the response message, according to a content of the response data;
- a fifth computer program code for causing the computer to store at least the response data and the identifier in correspondence; and
- a sixth computer program code for causing the computer to transmit to the first communication device a re-direct response message for re-directing the first communication device to a URL containing the identifier, instead of transmitting the response message containing the response data, when the response message containing the response data is received from the second communication device, and transmit the response message containing the response data stored in the memory unit in correspondence to the identifier contained in the URL when the request message for the URL containing the identifier is received from the first communication device through the first receiving unit.

* * * * *